No. 785,004.

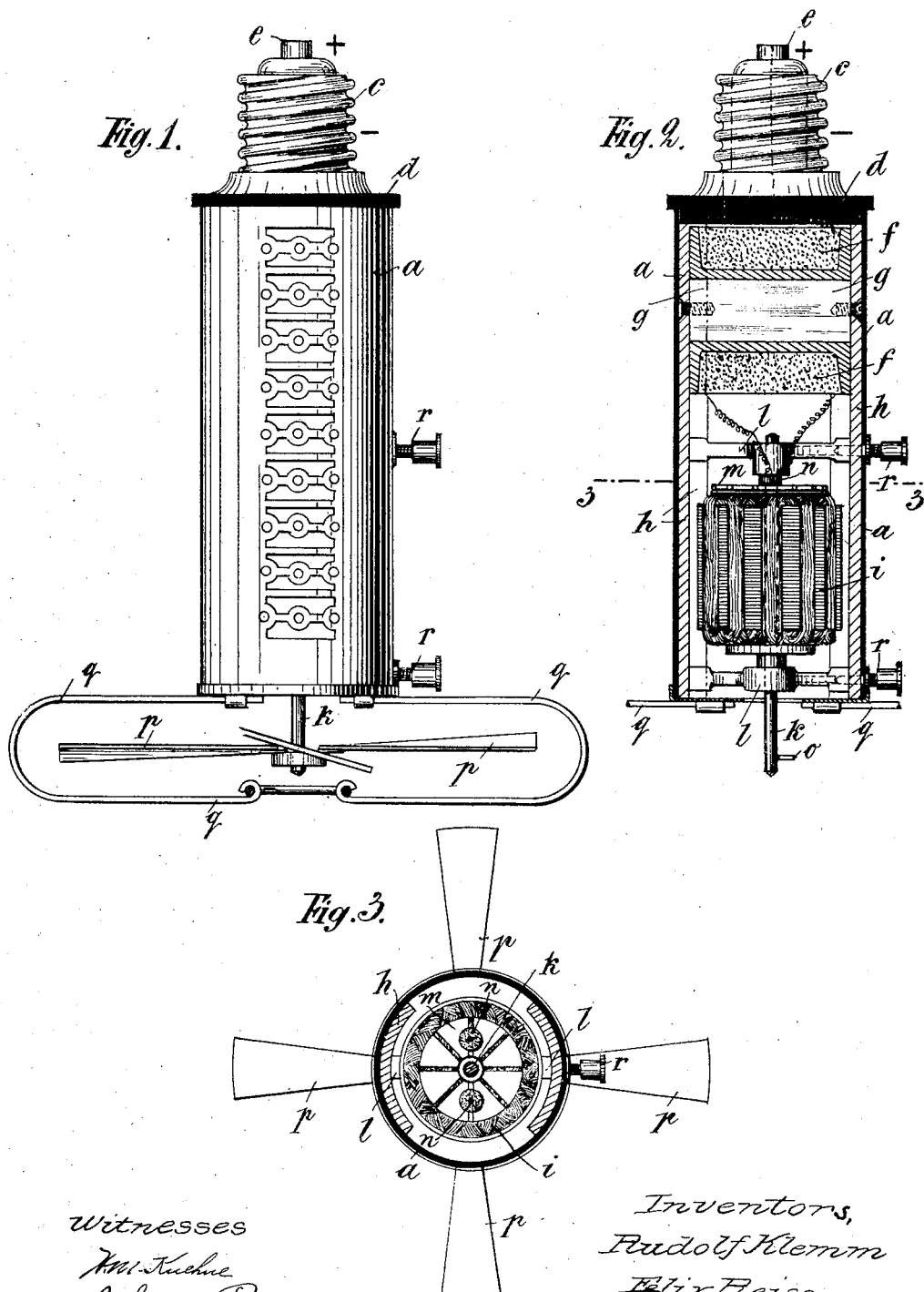

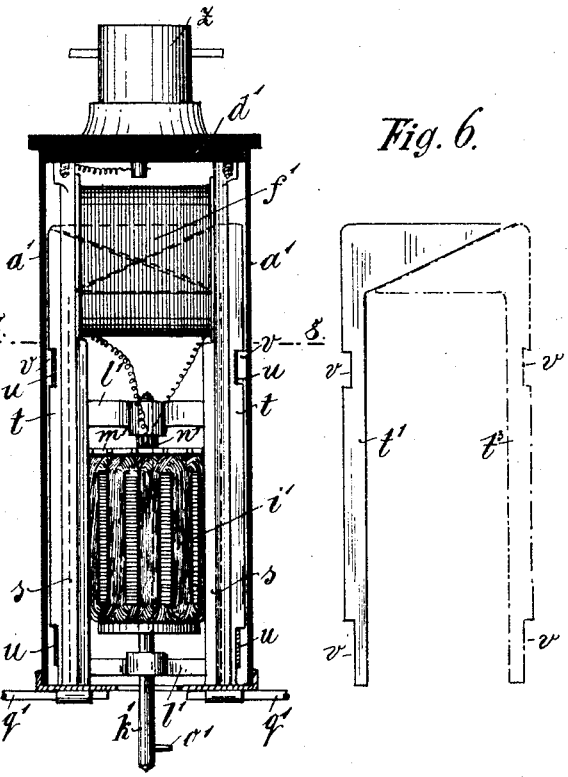
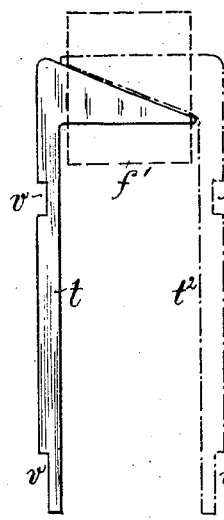
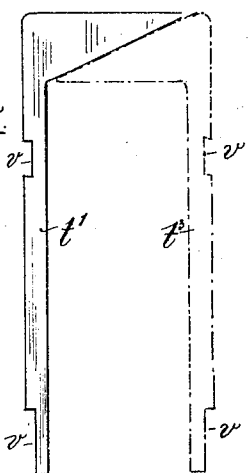
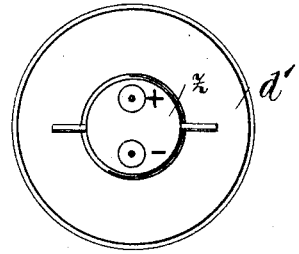
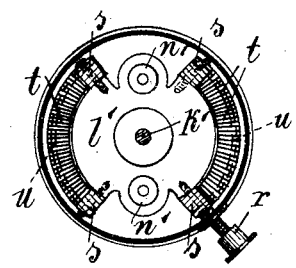

Patented March 14, 1905.

UNITED STATES PATENT OFFICE.

RUDOLF KLEMM AND FELIX REISS, OF BERLIN, GERMANY.

ELECTRIC MOTOR.

SPECIFICATION forming part of Letters Patent No. 785,004, dated March 14, 1905.

Application filed May 26, 1904. Serial No. 209,949.

*To all whom it may concern:*

Be it known that we, RUDOLF KLEMM and FELIX REISS, citizens of the Empire of Germany, residing at Berlin, in the Empire of Germany, have invented a new and useful Electric Motor, of which the following is a specification.

Our invention relates to improvements in electric motors, either for direct current or for alternating current, whereby they are adapted to easily replace incandescent lamps for performing mechanical works, such as driving small fans or similar devices.

The objects of our improvement are, first, to arrange the electric motor within a comparatively long and narrow cylindrical casing; second, to provide the one end of the casing with an insulated screw or terminal adapted to engage in electric sockets or the like; third, to dispose the armature in the one part of the cylindrical casing and a single field-magnet in the other part of the casing; fourth, to provide the core of the field-magnet with two opposite sectoral pole-shoes extending over the armature and partly inclosing it; fifth, to dispose between the projecting pole-shoes two studs with bearings for the armature-shaft; sixth, in the case of alternating current to form the two pole-shoes of two metallic frames and a plurality of thin angular plates, the longer sides of which are inclosed in the frames and the shorter sides of which are triangular for engaging in the spool and forming the core of the field-magnet, and, seventh, to arrange on the other end of the cylindrical casing the device to be driven. We attain these objects by the constructions illustrated in the accompanying drawings, in which—

Figure 1 is an elevation of the electric motor provided with a fan, part of the protecting-frame for the latter being shown in section. Fig. 2 is a vertical longitudinal section through the same when arranged for direct current, the insulated screw at the top and the armature being shown in elevation, the fan omitted, and most of its protecting-frame broken off. Fig. 3 is a horizontal cross-section through the same on the line 3 3 in Fig. 2. Fig. 4 is an elevation of a modified electric motor for alternating current, the casing and the pole-shoes proper being shown in section, the fan omitted, and most of its protecting-frame broken off. Fig. 5 is a top view of the same. Figs. 6 and 7 are views of two alternating pairs of thin angular plates of which the core and the pole-shoes of the field-magnet in Fig. 4 are formed, the left plates being shown in full lines and the right ones in dotted lines; and Fig. 8 is a horizontal cross-section through the electric motor shown at Fig. 4 on the line 8 8.

Similar letters of reference refer to similar parts throughout the several views.

The electric motor shown at Figs. 1 to 3 is arranged for direct current and disposed within a cylindrical casing $a$, of sheet metal or the like. On the upper end of the casing $a$ is secured an insulating disk or block $d$, provided with an ordinary Edison screw $c$. Thereby the whole can be secured in an electric socket of the corresponding construction. As the cylindrical casing $a$ is comparatively long and narrow, the electric motor is adapted to easily replace any incandescent lamp without interfering with any lamp-shade or other object. In the upper part of the casing $a$ is disposed the field-magnet of the electric motor, comprising a single spool $f$ and a core $g$. The two ends of the core $g$ are provided with two long sectoral pole-shoes $h$ $h$, secured thereon by screws and extending over the whole length of the casing $a$. In the lower part of the latter is disposed the armature $i$, of any known and approved construction. The shaft $k$ of this armature is mounted to turn in two suitable bearings, which form parts of two cross-bars $l$ $l$, whose ends are conveniently fastened on the insides of the two opposite pole-shoes $h$ $h$. Suitable oilers $r$ $r$ may be arranged without the casing $a$ for lubricating the shaft-bearings through holes (not shown) in the cross-bars $l$ $l$. It will be seen that the pole-shoes $h$ $h$ extend from the core $g$ over the armature $i$ and partly inclose the latter. (See Fig. 3.) The shaft $k$ carries on its upper end a commutator $m$, preferably in the shape of a disk, on which two carbon brushes $n$ $n$ are arranged to bear. The latter may be held by two lateral arms of the upper cross-bar $l$ and are therein insulated. The one brush $n$ is shown as connected by a wire with the one coil end of the spool $f$ and the other brush $n$ connected by a wire with the one electric contact—i. e., the metallic screw $c$—while the other coil end of the spool $f$ is connected by a wire with the other electric contact $c$. The lower end of the shaft $k$ carries the centrifugal device to be driven, which is here shown as an ordinary fan $p$. The shaft $k$ may be provided with a pin $o$ for coupling it in any known manner with nave of the fan $p$. A protecting-frame $q$, of any known construction, may be detachably secured on the lower end of the casing $a$. The fan $p$ may be arranged to be folded in any known and approved manner. For ventilating the electric motor the casing is preferably perforated on two opposite sides, as is clearly shown at Fig. 1.

The manner of operating the electric motor is very simple and obvious. After screwing home its screw $c$ in the respective electric socket the current is turned on by means of the known key in the socket, when the electric motor will be put into rotation and drive the fan. It will be seen that the whole can be put up on any electric chandelier, lamp-support, wall-arm—in fact, everywhere—in place of incandescent lamps and started forthwith. No special junction-cables or plug-keys or flexible cords as used with the ordinary electric cabinet-ventilators are necessary.

In case the electric sockets at disposal in a plant should have no screw-threads, but other connecting means—such as, for instance, the sockets for Swan incandescent lamps—of course the electric motor will require to be provided with the same terminal as the corresponding lamps. An example is illustrated in Figs. 4 and 5, where an electric motor with an ordinary Swan connection $z$ on the insulating-disk $d'$ is shown.

In case the electric motor is to be adapted for alternating current it is preferably constructed in the manner shown at Figs. 4 to 8. On the insulating block or disk $d'$ are fastened, by means of screws, two opposite metallic frames $s$ $s$. A plurality of thin angular plates $t$ and $t'$, Figs. 6 and 7, whose longer sides have a sector-shaped cross-section, (see Fig. 8,) are so put together that their shorter triangular and differently-inclined sides alternate one with the other, while the longer sides are secured between the vertical sides of the left metallic frame $s$ by means of metallic bands or hoops $u$ $u$, laid in their recesses $v$ $v$. Thus the left pole-shoe is formed. In a similar manner a plurality of thin angular plates $t^2$ and $t^3$ are put together and their longer sides secured between the vertical sides of the right metallic frame $s$ to form the right pole-shoe. The upper triangular projections of the two pole-shoes are inserted in the opening of the spool $f'$ and bear on each other alternately, as is clearly shown at Figs. 4, 6, and 7, so as to form the core of the field-magnet. Otherwise the construction of the alternating-current electric motor is substantially the same as that of the direct-current electric motor described above, and all the corresponding parts are marked with the same letters of reference, only that the index "1" has been added.

The electric motor, whether for direct current or for alternating current, is characterized by the single spool for the field-magnet and by the arrangement of the armature between the two pole-shoes in the direction of their length. Owing to this construction the electric motor is very compendious. We do not limit the use of this electric motor to its application to electric sockets for incandescent lamps, but reserve to ourselves the right of applying this electric motor on other electric connections. This motor may be used for driving not only fans, but also any other mechanical device.

The electric motors described may be varied in many respects without deviating from the spirit of our invention.

What we claim as our invention, and desire to secure by Letters Patent, is—

1. The combination with a cylindrical casing, of a straight core placed across within the one part of said cylindrical casing, a spool surrounding said straight core and forming therewith a field-magnet, two opposite sectoral pole-shoes secured on the two ends of said straight core and extending over the whole length of said cylindrical casing, two studs connecting said two opposite sectoral pole-shoes, a shaft within the other part of said cylindrical casing in its axis and mounted to turn in said two studs, an armature on said shaft, a commutator, two brushes therefor, an insulating-block on the end of said cylindrical casing near said straight core, a terminal on said insulating-block and adapted to engage in an electric socket and comprising two contacts, a wire connecting the one of said two contacts with the one of said two brushes, a wire connecting the other of said two contacts with the one coil end of said spool, a wire connecting the other coil end of said spool with the other of said two brushes, and a centrifugal device on said shaft without said cylindrical casing.

2. The combination with a cylindrical casing, of a straight core placed across within the one part of said cylindrical casing, a spool surrounding said straight core and forming therewith a field-magnet, two opposite sectoral pole-shoes secured on the two ends of said straight core and extending over the whole length of said cylindrical casing, two studs connecting said two opposite sectoral pole-shoes, a shaft within the other part of said cylindrical casing in its axis and mounted to turn in said two studs, an armature on said shaft, a commutator, two brushes therefor, an insulating-block on the end of said cylindrical casing near said straight core, a terminal on said insulating-block and adapted to engage in an incandescent-lamp socket and comprising two contacts, a wire connecting the one of said two contacts with the one of said two brushes, a wire connecting the other of said two contacts with the one coil end of said spool, a wire connecting the other coil end of said spool with the other of said two brushes, and a fan on said shaft without said cylindrical casing.

3. The combination with a cylindrical casing, of an insulating-block on one end of said cylindrical casing, a terminal on said insulating-block and adapted to engage in an electric socket and comprising two contacts, two opposite frames secured on the inside of said insulating-block and longitudinally reaching along the inside of said cylindrical casing, a plurality of thin angular plates whose longer sides of sectoral cross-section are put together and secured in said two opposite frames to form two sectoral pole-shoes, while the shorter sides placed across are triangular and alternately inclined so as to bear on each other and form a field-magnet core, a spool surrounding said field-magnet core, two disks connecting said two opposite frames, a shaft in the axis of said cylindrical casing and mounted to turn in said two disks, an armature on said shaft, a commutator, two brushes therefor, a wire connecting the one of said two contacts with the one of said two brushes, a wire connecting the other of said two contacts with the one coil end of said spool, a wire connecting the other coil end of said spool with the other of said two brushes, and a centrifugal device on said shaft without said cylindrical casing.

4. The combination with a cylindrical casing, of an insulating-block on one end of said cylindrical casing, a terminal on said insulating-block and adapted to engage in an incandescent-lamp socket and comprising two contacts, two opposite frames secured on the inside of said insulating-block and longitudinally reaching along the inside of said cylindrical casing, a plurality of thin angular plates whose longer sides of sectoral cross-section are put together and secured in said two opposite frames to form two sectoral pole-shoes, while the shorter sides placed across are triangular and alternately inclined so as to bear on each other and form a field-magnet core, a spool surrounding said field-magnet core, two disks connecting said two opposite frames, a shaft in the axis of said cylindrical casing and mounted to turn in said two disks, an armature on said shaft, a commutator, two brushes therefor, a wire connecting the one of said two contacts with the one of said two brushes, a wire connecting the other of said two contacts with the one coil end of said spool, a wire connecting the other coil end of said spool with the other of said two brushes, and a ventilator on said shaft without said cylindrical casing.

In witness whereof we have hereunto set our hands in presence of two witnesses.

RUDOLF KLEMM.
FELIX REISS.

Witnesses:
HENRY HASPER,
WOLDEMAR HAUPT